(12) United States Patent
Okamoto et al.

(10) Patent No.: US 7,309,019 B2
(45) Date of Patent: Dec. 18, 2007

(54) METHOD OF CHECKING AUTHENTICITY OF SHEET WITH BUILT-IN ELECTRONIC CIRCUIT CHIP

(75) Inventors: Chikashi Okamoto, Kawasaki (JP); Kazuo Takaragi, Kawasaki (JP); Kazutaka Tsuji, Kokubunji (JP); Mitsuo Usami, Kokubunji (JP); Chizuko Yasunobu, Tokyo (JP); Asahiko Isobe, Tokyo (JP); Yasuhiro Tsunemi, Tokyo (JP); Hiroyuki Yagi, Tokyo (JP)

(73) Assignees: Hitachi, Ltd., Tokyo (JP); Hitachi Research Institute, Tokyo (JP)

( * ) Notice: Subject to any disclaimer, the term of this patent is extended or adjusted under 35 U.S.C. 154(b) by 0 days.

(21) Appl. No.: 11/324,283

(22) Filed: Jan. 4, 2006

(65) Prior Publication Data

US 2006/0108412 A1 May 25, 2006

Related U.S. Application Data

(63) Continuation of application No. 10/673,451, filed on Sep. 30, 2003, now Pat. No. 7,007,854, which is a continuation of application No. 09/857,271, filed on Nov. 27, 2001, now Pat. No. 6,659,353.

(30) Foreign Application Priority Data

Dec. 7, 1998 (JP) .................................. 10-346738

(51) Int. Cl.
*G06K 19/06* (2006.01)
(52) U.S. Cl. ...................................... 235/492; 235/379
(58) Field of Classification Search ................ 235/492, 235/379, 375; 340/5.86, 5.81; 902/1, 2, 902/7

See application file for complete search history.

(56) References Cited

U.S. PATENT DOCUMENTS

| 4,746,788 | A | | 5/1988 | Kawana |
| 4,961,142 | A | | 10/1990 | Elliott et al. |
| 5,341,428 | A | * | 8/1994 | Schatz ........................ 713/185 |
| 5,545,885 | A | * | 8/1996 | Jagielinski .................. 235/449 |
| 5,601,931 | A | | 2/1997 | Hoshino et al. |
| 5,629,981 | A | | 5/1997 | Nerlikar |
| 5,748,737 | A | | 5/1998 | Daggar |
| 5,754,654 | A | | 5/1998 | Hiroya et al. |
| 5,984,190 | A | * | 11/1999 | Nevill ......................... 235/492 |
| 6,039,249 | A | * | 3/2000 | Szewczykowski .......... 235/379 |
| 6,268,796 | B1 | | 7/2001 | Gnadinger et al. |
| 6,547,151 | B1 | * | 4/2003 | Baldi .......................... 235/492 |
| 6,830,192 | B1 | * | 12/2004 | de Leeuw et al. .......... 235/492 |

FOREIGN PATENT DOCUMENTS

| DE | 19608757 | 9/1997 |
| EP | 0583709 | 2/1994 |
| JP | 57-161993 | 10/1982 |

(Continued)

*Primary Examiner*—Ahshik Kim
(74) *Attorney, Agent, or Firm*—Mattingly, Stanger, Malur & Brundidge, P.C.

(57) ABSTRACT

A method of checking a sheet as to forgery thereof, the sheet being provided with an electronic circuit chip from or in which information can be read out or written and having visible information. The method includes a step of encrypting the visible information of the sheet and storing the encrypted visible information in the electronic circuit chip, and a step of determining discriminatively the authenticity of the sheet by comparing the visible information of the sheet with the information stored in the electronic circuit chip.

6 Claims, 14 Drawing Sheets

FOREIGN PATENT DOCUMENTS

| | | |
|---|---|---|
| JP | 3-188590 | 8/1991 |
| JP | 4-248695 | 9/1992 |
| JP | 05174207 | 7/1993 |
| JP | 7-85172 | 3/1995 |
| JP | 10-291391 | 11/1998 |
| WO | 98/57299 | 12/1998 |
| WO | 99/08230 | 2/1999 |

* cited by examiner

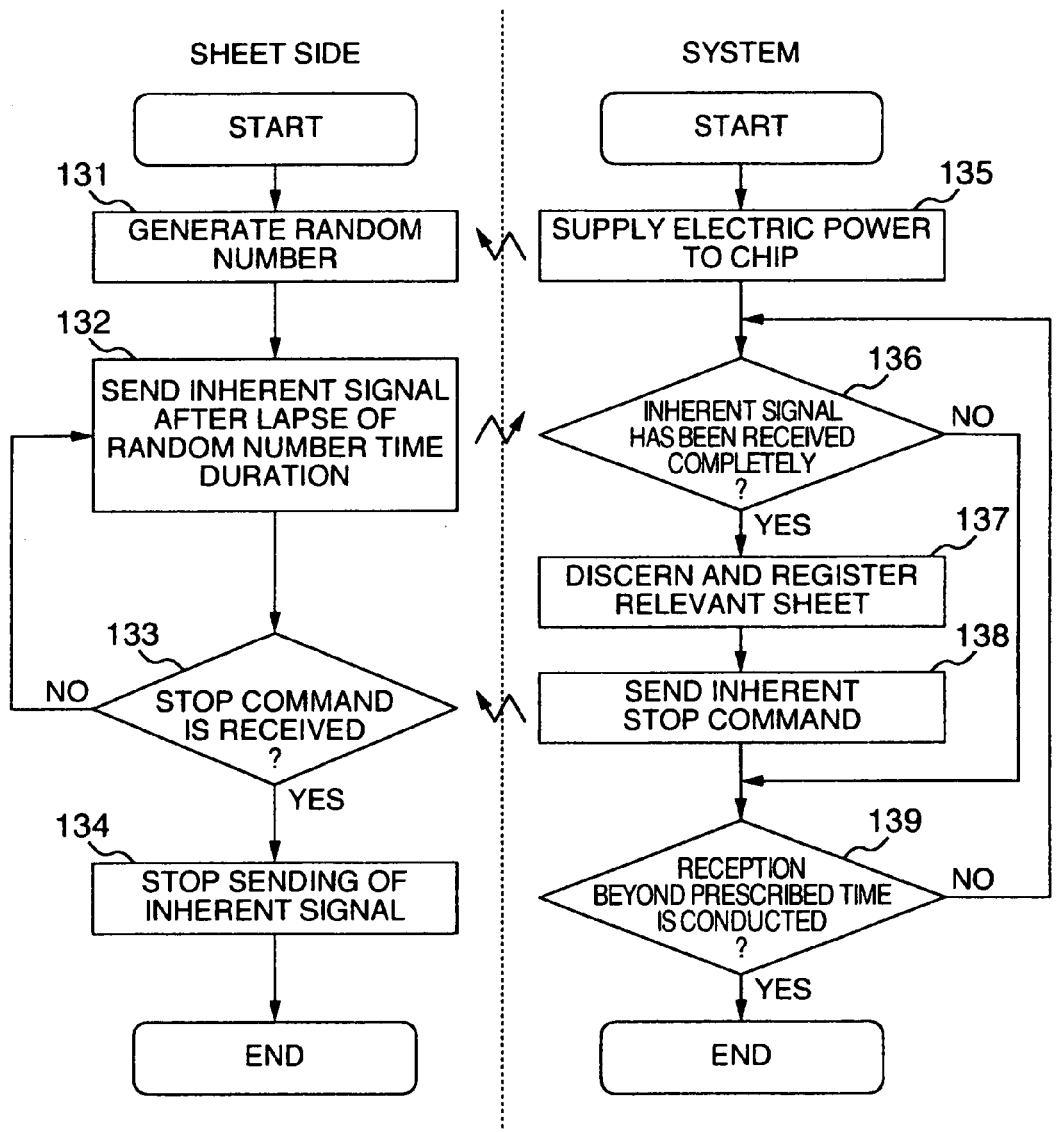

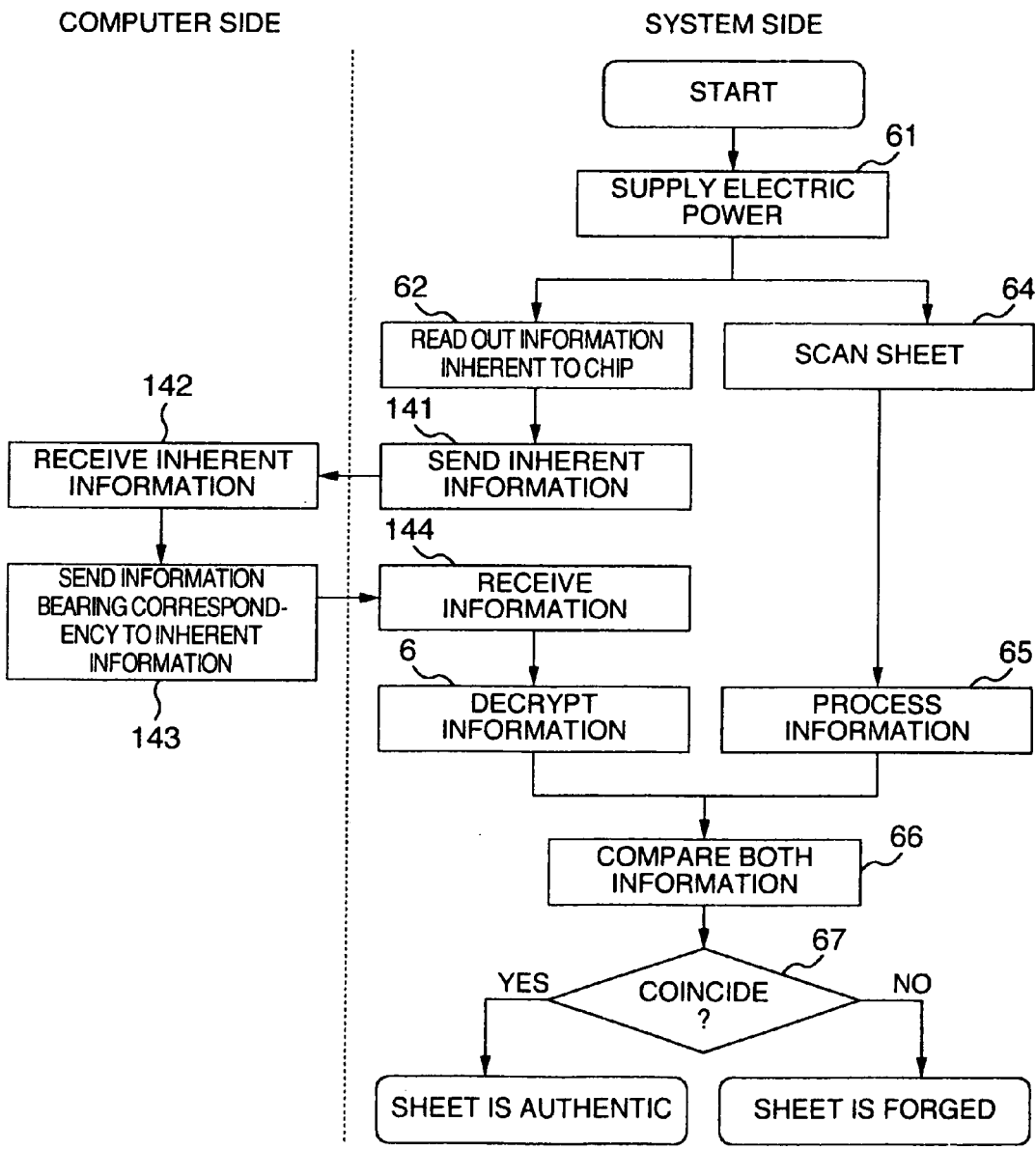

METHOD OF CHECKING AUTHENTICITY OF SHEET WITH BUILT-IN ELECTRONIC CIRCUIT CHIP

This is a continuation application of U.S. Ser. No. 10/673,451, filed Sep. 20, 2003, now U.S. Pat. No. 7,007,854, which is a continuation application of U.S. Ser. No. 09/857,271, filed Nov. 27, 2001, now U.S. Pat. No. 6,659,353.

TECHNICAL FIELD

The present invention relates to management of sheets having visible information.

BACKGROUND ART

For preventing forgery of sheets such as valuable papers, bank notes, documents and the like which carry visible information, there have heretofore been adopted such measures as printing a fine or detailed pictorial pattern and/or characters or the like on the sheet, pasting a hologram on the sheet or impressing a watermark in the sheet while details of these measures being kept in secrecy in an attempt to make it difficult to forge or counterfeit the sheet. Further, inspection of the sheet as to forgery can be carried out by comparing the optical information of printing position on the sheet, fineness of pattern lines, color density or brightness, etc. with the corresponding information of the genuine sheet.

Furthermore, sheet management such as counting of the number(s) of the sheets has heretofore been performed manually or physically with a machine on a sheet-by-sheet basis.

At present, however, technological progress in this field has made it possible to impress the watermark, hologram and the like, and now the information such as mentioned previously can be printed with a high accuracy which is comparable to that of the genuine sheet even though the printing procedure may differ. Such being the circumstances, difficulty is encountered in detecting the forgery solely by relying on the comparison of the optical information.

Additionally, it is noted that in the case of bonds of a same species, the optical information of pictorial pattern or the like which can be used for checking or detecting the forgery remains identical for all the bonds and that the information inherent to the bond such as the bond ID number or the like is not used for the inspection of the forgery. Consequently, once a pictorial pattern of a given bond was counterfeited, there may arise such risky situation that a great number of bonds printed with the counterfeit pattern and having the inherent information such as the ID numbers rewritten are fabricated on a mass-production scale or the contents of the bonds are easily counterfeited.

Besides, in conjunction with such management of the sheets as counting of the number thereof, etc., it is noted that the volume, species, sizes, etc. of the sheets which can be handled at one stretch are limited although it depends on the scale of the managing system. Consequently, a time-consuming troublesome procedure or a large scale of the managing system is required for the management of a large number of sheets. On the other hand, it is also known to manage articles by affixing so-called radio tags onto articles to be managed. However, reliability of the congestion controlling function of the conventional radio tags generally used at present is not so high. Accordingly, employment of the radio tag is not suited for the cases where very high reliability is required as in the case of management of the valuable papers, bank notes and so forth.

DISCLOSURE OF INVENTION

Thus, it is an object of the present invention to provide a structure of sheets having visible information such as bonds, exchange tickets, paper currencies, various labels, documents or the like which allows the counterfeit, if any, to be detected without difficulty, a method of manufacturing such sheets, an apparatus for manufacturing the same, a method of checking the sheets as to the forgery, and an apparatus for detecting the forged or counterfeit sheets.

Moreover, it is another object of the present invention to provide a system capable of handling speedily once a large number of sheets under management which differ from one another in respect to the species and the size with high reliability by using a small-scale apparatus, a method of implementing the same and a sheet therefor.

For achieving the object mentioned above, the present invention teaches that an electronic circuit chip from or in which information can be read or written is incorporated in the sheet. Further, it is taught that information inherent to each sheet is encrypted or a digital signature is generated for affixation, whereon the encrypted information or the digital signature or both of them are stored in the above-mentioned electronic circuit chip or another storing means.

At this juncture, it is contemplated with the phrase "another storing means" to mean another electronic circuit chip mounted on one and the same sheet or a storage medium (e.g. memory, hard disk or the like) provided externally of the sheet. When the information is to be stored in the storage medium provided externally of the sheet, the information should be stored in the state associated with the ID (identification) information stored in the chip on the sheet.

As the intrinsic or inherent information to be stored, there may be mentioned, for example, visible information which the sheet intrinsically or inherently presents (inclusive of the ID number differing from one to another sheet) or physical/chemical information of the electronic circuit chip. Further, shapes or geometrical factors of distinctively discernible sheet constituent elements, physical or chemical information of other discernible materials or elements inserted or embedded in the sheet can be used as the inherent information which is intrinsic to the sheet. Besides, relative positions of the sheet constituent element(s) and the discernible material or element relative to the electronic circuit chip can equally be used as the inherent information. Thus, by comparing the information available from the electronic circuit chip or the external storing means with the information acquired by actually scanning the sheet, it is possible to check the sheet as to the forgery thereof.

Further, the sheet according to the present invention incorporates an electronic circuit chip, i.e., so-called built-in electronic circuit chip, which includes a means for transmitting intermittently signals indicative of the information inherent to the individual sheets (hereinafter also referred to as the sheet-inherent information), respectively, with every random transmission interruption period and a means for stopping the transmission in response to a stop command. On the other hand, the management system according to the present invention is designed to receive the sheet-inherent signals from the individual sheets to thereby manage a plurality of sheets concurrently.

More specifically, upon reception of the sheet-inherent signal from a given sheet, the management system performs recognition processing for that sheet to thereby send a stop command which is valid only for that sheet. In case the management system can not correctly receive a plurality of signals sent concurrently, the management system does not issue the stop command but waits for till the signals inherent to the individual sheets, respectively, are sent again. The signals sent from all the sheets can be received within a predetermined time period. In this way, the sheets can be managed. Additionally, species of the sheets can discriminatively be specified on the basis of the information inherent to the individual sheets. Furthermore, by using a means for transmitting a ratio wave over a limited coverage range and by performing recognition processing for the sheets while moving the above-mentioned means along the direction in which the sheets are stacked, the ratio or frequency at which the signals are simultaneously sent from a plurality of sheets can be reduced. Thus, management of the sheets can be carried out at a high speed with enhanced reliability.

Thus, the forgery checking method according to the present invention is designed for checking a sheet such as bond, document or the like as to forgery thereof, each of which sheets is provided with an electronic circuit chip from or in which information can be read out or written and has visible information, the method being characterized in that the visible information of the sheet mentioned above is encrypted to be stored in the electronic circuit chip mentioned above, and that authenticity of the sheet is decided by making use of the visible information of the sheet and the information stored in the electronic circuit chip.

More specifically, the method is characterized by making decision as to the authenticity of the sheet by comparing the visible information of the sheet with the information stored in the electronic circuit chip.

Further, the forgery checking method according to the present invention resides in a method of checking the sheet as to forgery thereof by making use of the information acquired by scanning the sheet and the information stored in the above-mentioned electronic circuit chip, which method is characterized in that physical or chemical information of sheet constituent elements which can be discerned externally of the sheet is encrypted to be stored in the electronic circuit chip.

Furthermore, the forgery checking method according to the present invention resides in a method of checking the sheet as to forgery thereof by making use of the information acquired by scanning the sheet and the information stored in the above-mentioned electronic circuit chip, which method is characterized in that relative position information of the above-mentioned sheet constituent elements relative to the electronic circuit chip is encrypted to be stored in the electronic circuit chip.

Further, the forgery checking method according to the present invention resides in a method of checking the sheet as to forgery thereof by making use of the information acquired by scanning the sheet and the information stored in the above-mentioned electronic circuit chip, which method is characterized in that the above-mentioned information and digital signature information for that information are stored in the electronic circuit chip.

Furthermore, the forgery checking method according to the present invention resides in a method of checking the sheet as to forgery thereof by making use of the information acquired by scanning the sheet and the information stored in the above-mentioned electronic circuit chip, which method is characterized in that the above-mentioned information is stored in at least two electronic circuit chips incorporated in a single sheet, that the sheet is decided to be a forged one when difference is found in a greater number of pieces of information than a proper threshold value which is determined on the basis of information elements such as the number of pieces of information stored in the electronic circuit chip, accuracy and the like, and that the sheet is decided to be an authentic one when difference is found in a number of pieces of said information which is equal to or smaller than the above-mentioned threshold value.

Further, the forgery checking method according to the present invention resides in a method of checking the sheet as to forgery thereof by making use of the information acquired by scanning the sheet and the information stored in the above-mentioned electronic circuit chip, which method is characterized in that the electronic circuit chip is mounted on the sheet at a random position thereof, that the above-mentioned information is acquired by scanning the sheet after mounting of the electronic circuit chip, and that the above-mentioned information is encrypted or alternatively a digital signature is generated and affixed to the above-mentioned information or alternatively the above-mentioned information is encrypted with a digital signature being generated to be affixed to the encrypted information and then stored in the electronic circuit chip.

Furthermore, the forgery checking method according to the present invention resides in a method of checking the sheet as to forgery thereof by making use of the information acquired by scanning the sheet and the information stored in the above-mentioned electronic circuit chip, which method is characterized in that information inherent to the electronic circuit chip is stored in that electronic circuit chip, and the above-mentioned information to be stored in the above-mentioned electronic circuit chip is stored in another storing means differing from the above-mentioned electronic circuit chip while establishing correspondence with information inherent to the above-mentioned electronic circuit chip.

Additionally, a sheet management system provided by the present invention is characterized by a means for receiving signals from sheets having respective electronic circuit chips mounted thereon, each of the electronic circuit chips being comprised of a means for transmitting intermittently a sheet-inherent signal with every random transmission interruption periods and a means for stopping the transmission in response to reception of a stop command, a means for emitting a radio wave over a limited coverage while being moved along a direction in which the sheets are stacked, and a means for performing identification of the sheet upon reception of the signal from that sheet to thereby send the stop command valid only for that sheet, while waiting for a predetermined time unless the signal is received.

Incidentally, the phrase "physical or chemical information" of the electronic circuit chip and the sheet constituent elements used in the description of the present invention includes information indicating their respective features such as dimensions, masses, materials and the like.

Additionally, the phrase "visible information" used in the description of the present invention includes information indicated visibly by print, watermark, surface unevenness, pasted thing, display of a display element or the like. Further, the visible information may also subsume such information which can be discerned by touch.

Furthermore, the term "sheet" used in the description of the present invention connotes a card or the like having a thickness and rigidity.

Further, the term "forgery" or "counterfeit" used in the description of the present invention subsumes substitution or reproduction.

Furthermore, the term "management" used in the description of the present invention subsumes counting of the number of sheets, discrimination of the species, summing of face amounts of valuable papers and so forth.

BRIEF DESCRIPTION OF DRAWINGS

FIG. 13 is a flow chart for illustrating a sheet management procedure according to the sixth embodiment of the present invention.

FIG. 14 is a flow chart for illustrating a forged sheet detecting procedure according to a fifth embodiment of the present invention.

BEST MODE FOR CARRYING OUT THE INVENTION

First Embodiment

In the following, a first embodiment of the present invention will be described.

Figure 1:
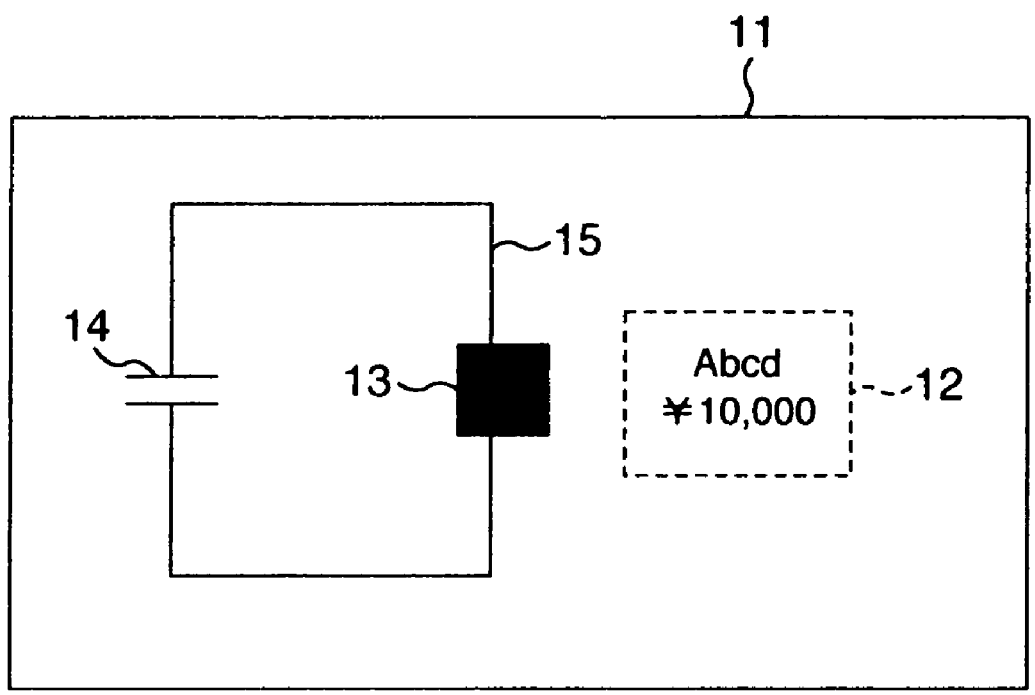
FIG. 1 is a view showing a circuit implemented in the form of an electronic circuit chip and a sheet on which the circuit is mounted according to a first embodiment of the present invention.

At first, reference is made to FIG. 1 which shows a sheet having information visibly recorded on a surface thereof, an electronic circuit chip mounted on the sheet and elements designed for performing the information read-out operation for the electronic circuit chip.

In the figure, reference numeral 11 denotes a sheet having an electronic circuit chip mounted thereon, wherein the sheet has a surface printed with information 12. Numeral 13 denotes the electronic circuit chip for which information read-out operation can be performed. The electronic circuit chip is implemented by integrating an electronic circuit on a silicon chip. A capacitor 14 and an antenna 15 serve as the elements for allowing the information read-out operation to be performed for the electronic circuit chip 13 in a contactless manner relative to the sheet 11. Stored in the electronic circuit chip 13 is the information intrinsic to the sheet 11 or the electronic circuit chip 13 or the combination thereof.

When a radio wave is applied externally to the sheet 11, an electric current is induced in the antenna 15 under the effect of this radio wave, as a result of which electric charges are stored in the capacitor 14. Thus, the electronic circuit chip 13 is put into operation to carry out communication of the information through the medium of the antenna 15.

Incidentally, in the case of the instant embodiment of the invention, the circuit is implemented for the contactless communication. However, the circuit may be designed for performing contact-type communication. In that case, terminals appearing on the sheet surface are found, whereupon an electric power is supplied thereto via a source terminal to thereby put the electronic circuit chip into operation for allowing communication of information to be carried out via a communication terminal.

Figure 2:
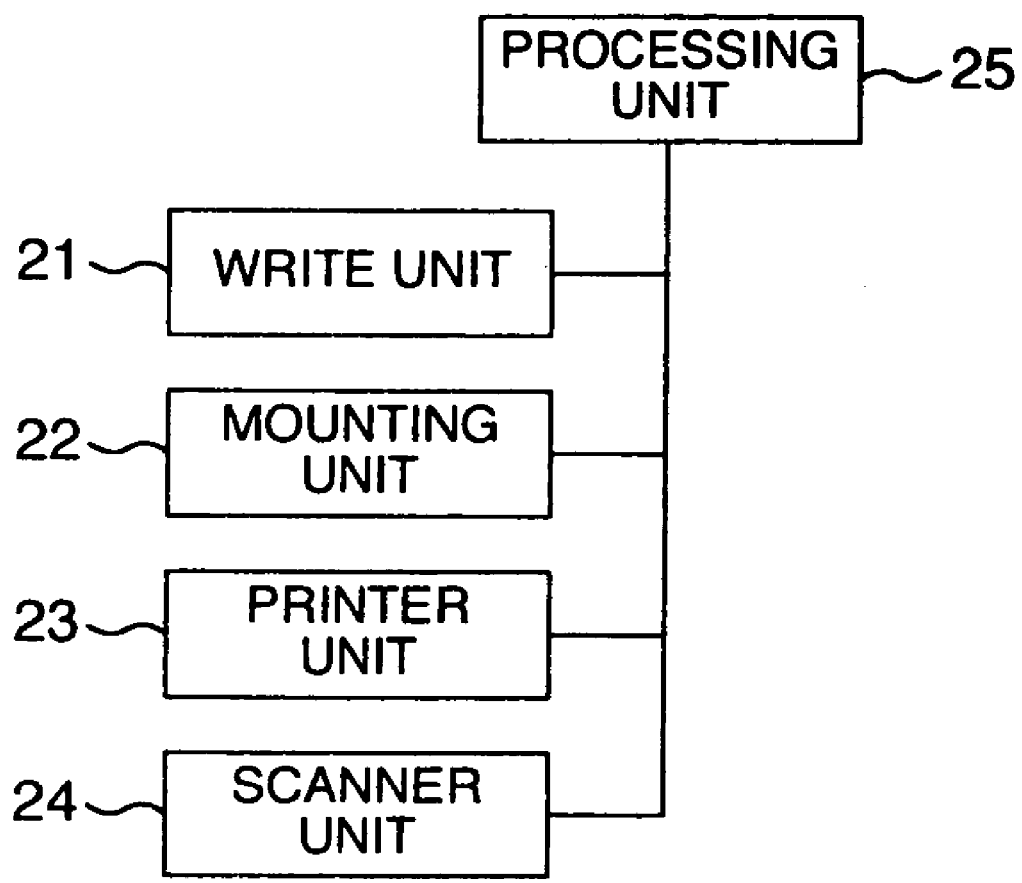
FIG. 2 is a view showing a configuration of a manufacturing apparatus for manufacturing a forged sheet according to the first embodiment of the present invention.

FIG. 2 is a view showing a configuration of a manufacturing apparatus for manufacturing the sheet 11 according to the instant embodiment.

In the figure, reference numeral 21 denotes a device or unit for writing information in the electronic circuit chip 13. Numeral 22 denotes a device or unit for mounting the electronic circuit chip 13 on the sheet 11. Numeral 23 denotes a device or unit for printing visible information on the sheet. Numeral 24 denotes a scanner instrument or unit designed for scanning the surface and the internal of the sheet.

Reference numeral 25 denotes a unit which is in charge of controlling the information processing as well as operations of the devices or units mentioned above.

Next, referring to FIG. 3 which shows a flow chart for illustrating a procedure of manufacturing the sheet 11 according to the instant embodiment of the invention, description will be made of the sheet manufacturing procedure.

At first, contents to be printed on the sheet are encrypted by the processing unit 25 (step 31). Subsequently, the encrypted information is written in the electronic circuit chip 13 by means of the write unit 21 (step 32). The electronic circuit chip 13 mentioned above is then mounted on the sheet 11 by using the mounting unit 22 (step 33). Finally, the surface information 12 is printed on the sheet 11 by using the printer unit 23 (step 34). Then, the sheet is finished.

In this conjunction, it should be mentioned that although the information is printed in the case of the instant embodiment, any other appropriate methods may equally be resorted to so far as the visible information can be displayed.

Figure 4:
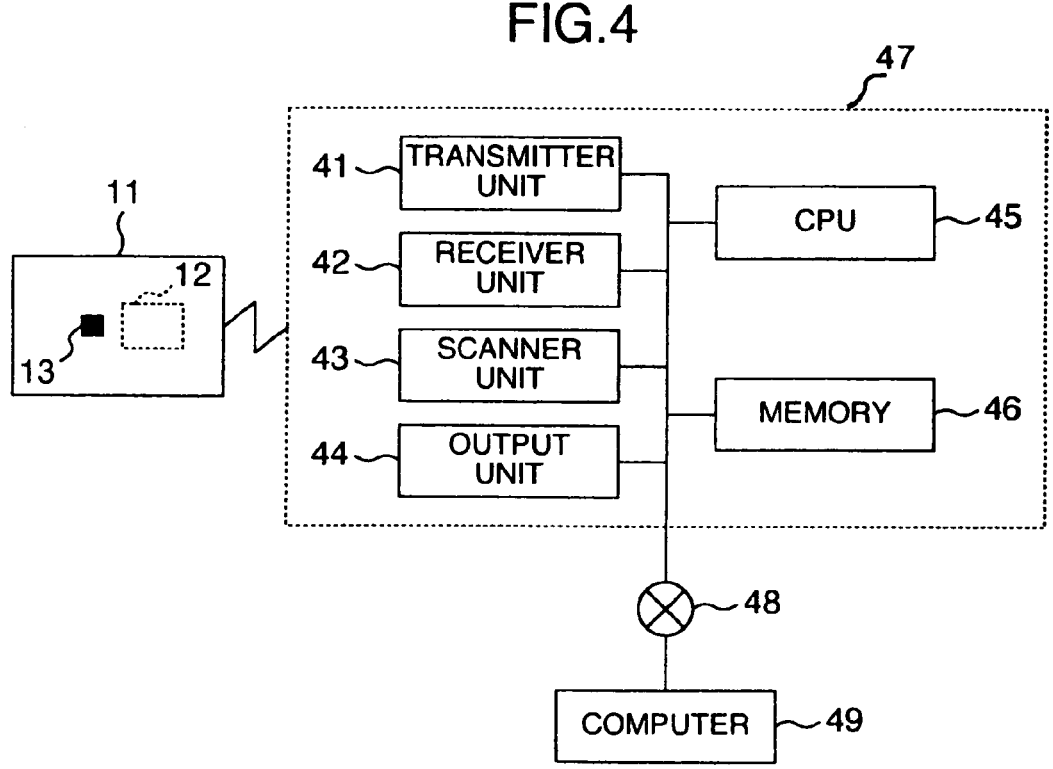
FIG. 4 is a view showing a hardware structure of a forgery checking system according to the first embodiment of the present invention.
Figure 5:
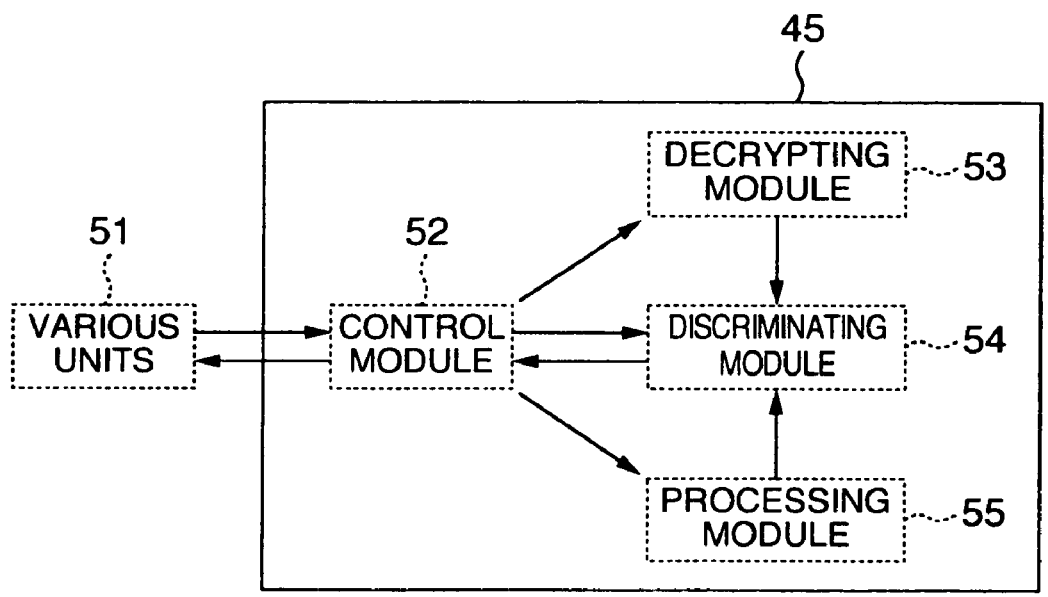
FIG. 5 is a view showing a software structure of the forgery checking system according to the first embodiment of the present invention.
Figure 6:
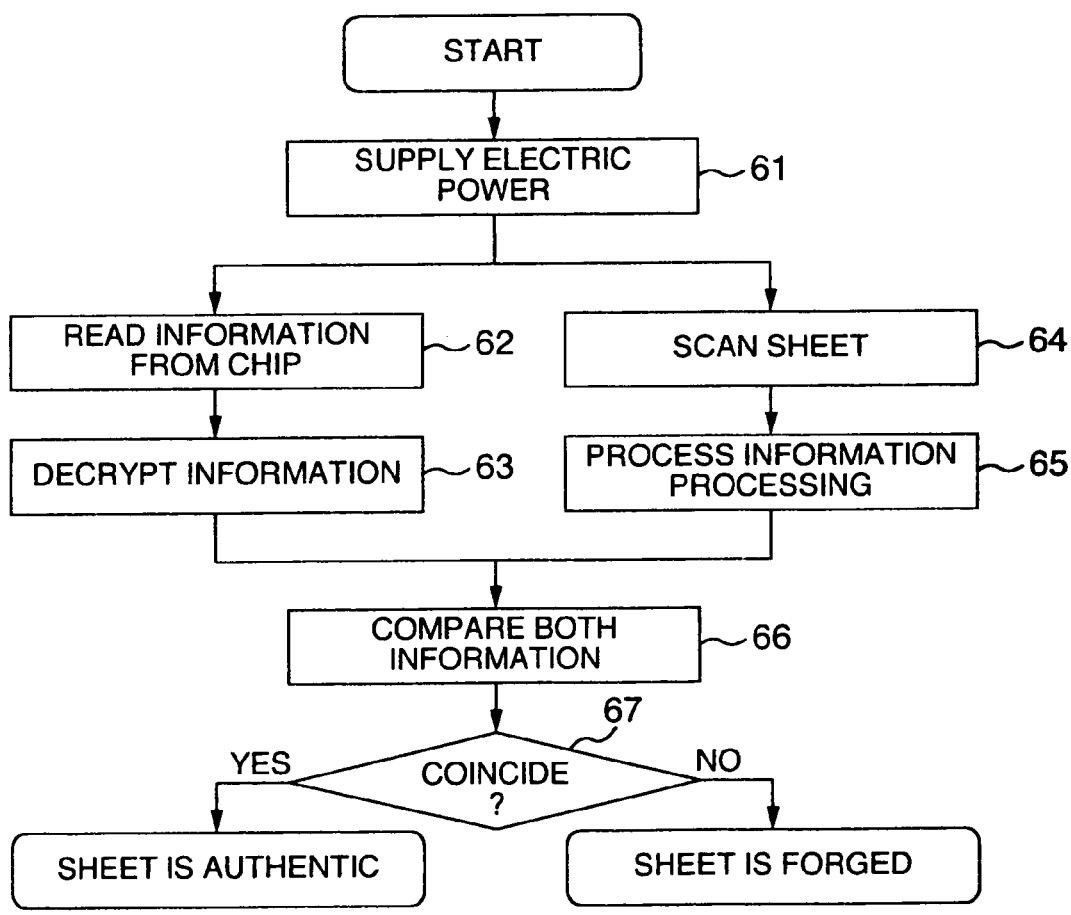
FIG. 6 is a flow chart for illustrating a forged sheet detecting procedure according to the first embodiment of the present invention.

Next, description will turn to a method of detecting a forged sheet by reference to FIGS. 4 to 6. A hardware structure of a forged sheet checking system is shown in FIG. 4, while a software structure of the forged sheet checking system is shown in FIG. 5. FIG. 6 shows a flow chart for illustrating a forged sheet checking procedure according to the instant embodiment of the invention.

At first, a control module 52 issues a command to a transmitter unit 41 for commanding it to send a radio wave toward the sheet 11 for thereby feeding an electric power to the sheet 11 (step 61). The electronic circuit chip 13 supplied with electric power through the medium of the radio wave sends out the information stored therein by way of the antenna 15, the signal as sent out being received by a receiver unit 42 (step 62). The control module 52 transfers the information from the receiver unit 42 to a decrypting module 53 which responds thereto by decrypting the information (step 63).

A scanner unit 43 scans the surface of the sheet 11 and the internal structure thereof (step 64). The control module 52 transfers the image or the like information as acquired to the processing module 55 which responds thereto by executing information processing such as image processing or the like (step 65).

A discriminating module 54 compares the decrypted information originating in the electronic circuit chip 13 and transferred from the decrypting module 53 with the information acquired by scanning the sheet 11 and transferred from the processing module 55 (step 66). When both the data coincide with each other, it is decided that the information 12 on the sheet surface is genuine, whereas in case both the data differ from each other, then decision is made that the information 12 on the sheet surface is counterfeit (step 67).

The control module 52 causes the output unit 44 to generate display information indicative of the result of the decision made by the discriminating module 54 or alternatively causes the other means to output the information indicative of the decision output of the discriminating module.

The operations and the processings described above by reference to FIGS. 5 and 6 can be realized by executing a program stored in the memory 46 by means of the CPU 45.

Figure 3:
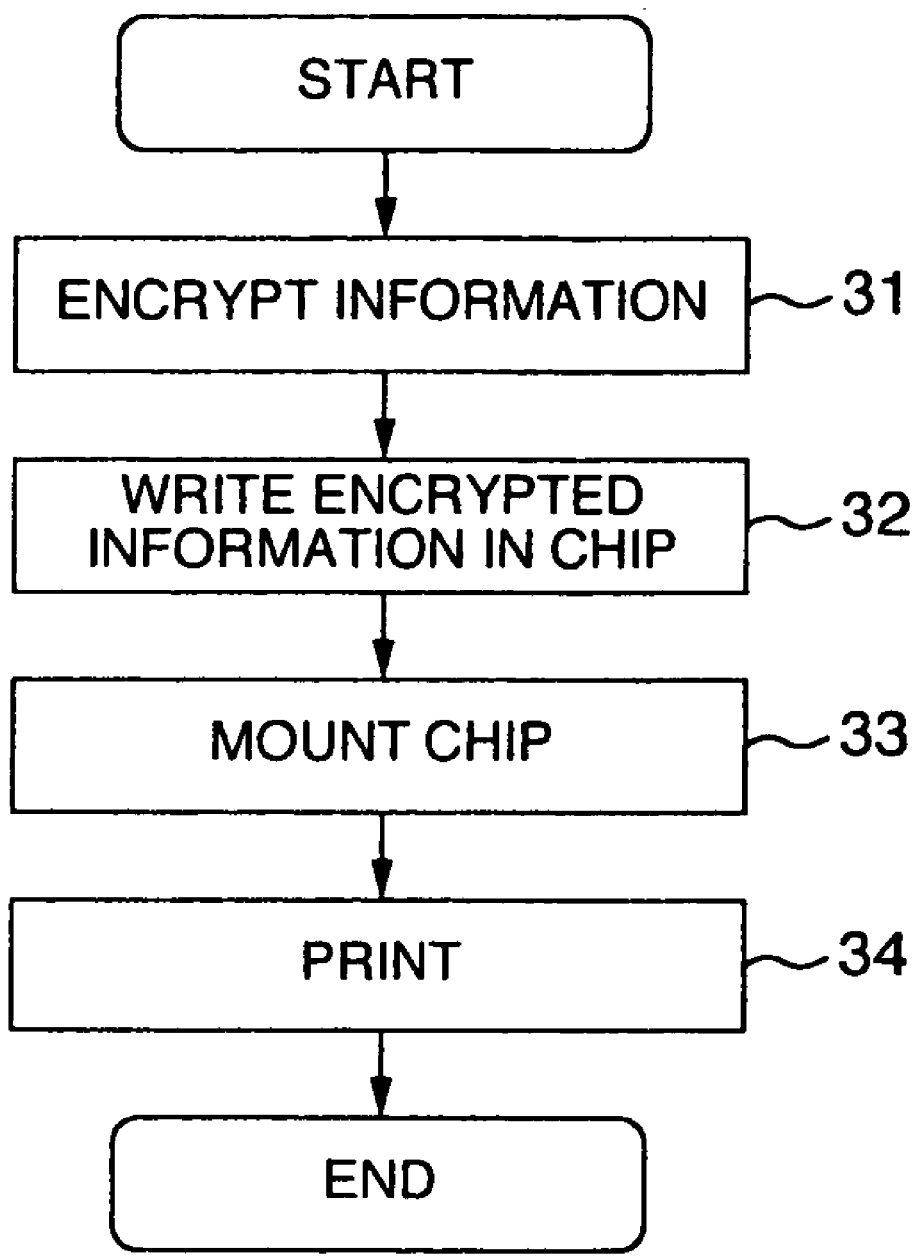
FIG. 3 is a flow chart for illustrating a procedure of manufacturing a forged sheet according to the first embodiment of the present invention.

In the case of the instant embodiment, the information 12 inherent to the sheet surface, i.e., the sheet-inherent information, is encrypted to be stored in the electronic circuit chip 13 upon manufacturing of the sheet, as described hereinbefore by reference to in FIG. 3. In case the information 12 on the sheet surface is altered or falsified, the information 12 becomes different from that resulting from the decryption of the encrypted information stored in the electronic circuit chip 13. Accordingly, with the aid of the forgery checking system 47, the alteration of the information on the sheet surface can be detected by comparing both the information. In this conjunction, it is noted that rewriting of the information stored in the electronic circuit chip 13 so as to have the same content as the information of the sheet surface having been altered is practically impossible because the cypher has to be solved. In this manner, the teaching of the invention incarnated in the instant embodiment is effective for preventing the alteration of the sheet surface information.

In the encryption described above, when the information stored in the electronic circuit chip is important or the volume of the information is large, the public key cryptosystem should preferably be adopted while the common key cryptosystem may advantageously be employed in the case where the authenticity of the sheet must be checked at a high speed. When the public key cryptosystem is adopted, the memory as required may be of a small capacity because the length of the key is short with high security being ensured because of impossibility of estimating the encrypting key from the key for decryption. On the other hand, the common key cryptosystem allows the decryption of data to be speedily performed.

It should further be added that when an only-once-writable electronic circuit chip is used as the electronic circuit chip 13 for storing the information not encrypted, rewriting of the information stored in that electronic circuit chip can be prevented, which is thus effective for preventing the sheet from being altered.

Further, by encrypting the information and writing it in the only-once-writable electronic circuit chip, there can be realized a further fortified rewrite protecting means effective for preventing the forgery of the sheet.

According to the teaching of the invention incarnated in the instant embodiment, not only the information common to the sheets of a same species such as the information of watermark, pattern and/or the like but also the information inherent to the individual sheets, respectively, such as security number or the like is written in the electronic circuit chip. Accordingly, even if a plurality of sheets having the visible information which coincides with that stored in the electronic circuit chip could be reproduced from a given sheet, then the inherent information such as the bond ID numbers of the reproduced sheets are identical with one another. Consequently, in case the counterfeit sheets are mass-produced, there arises contradiction or contradictiousness that the sheets of the same ID number exist simultaneously at different places or locations, which can readily lead to revelation of the counterfeit reproduction of the sheet. In that case, the ID number of the reproduced sheets may be registered in a computer 49 connected to the forgery checking system 47 via a network 48 to thereby make it impossible to use the reproduced sheets subsequently. In this way, counterfeit reproduction of the sheet can effectively be suppressed.

Furthermore, in the case of the instant embodiment of the invention, the physical or chemical information of the electronic circuit chip 13 is encrypted to be stored in the electronic circuit chip. Since much advanced technique is required for manufacturing the electronic circuit chip 13 in a very fine or miniature structure, reproduction of such electronic circuit chip is rendered impossible by managing the chip manufacturing technology by the manufacturer or the issuer of the sheet. Even if the other portion of the sheet 11 than the electronic circuit chip 13 should be reproduced with the information stored in the electronic circuit chip being reproduced, it is yet possible to detect the counterfeit reproduction of the electronic circuit chip by comparing the information concerning the size or dimensions of the electronic circuit chip as obtained by measurement with the information stored in the electronic circuit chip by means of the forgery checking system 47.

At this juncture, it should be mentioned that measurement of the size of the electronic circuit chip is not restricted to the straightforward measurement based on the image information but may be performed indirectly on the basis of the radio wave reception range. By way of example, a plurality of fine electronic circuit chips of miniature size are mounted in an array as closely as possible on the sheet within a predetermined region. In that case, when a number of radio waves corresponding to that of the electronic circuit chips are received from the predetermined region of the sheet upon reception of the signals from these electronic circuit chips, it can then be decided at the least that the size of the electronic circuit chip is smaller than the prescribed one. In this conjunction, it is to be mentioned that manufacturing of the counterfeit electronic circuit chip in the substantially same small size as the normal one encounters a great difficulty. Accordingly, even if the information stored in the electronic circuit chip could be reproduced, it is nevertheless impossible to mount a same number of the counterfeit fine electronic circuit chips within the predetermined region. This feature of the instant embodiment of the invention is equally effective for prevention of the counterfeit reproduction of the sheet.

As is apparent from the above, the teachings of the invention incarnated in the instant embodiment are very effective for the prevention of forgery such as alteration, counterfeit reproduction thereof and the like.

In the foregoing description, it has been presumed that the information 12 recorded on the sheet surface is used as the visible information carried by the sheet. However, the invention is never restricted thereto but any type of information can be made use of so far as it is visible. By way of example, visible information impressed internally of the sheet such as, for example, watermark may be used to this end.

Furthermore, although it has been described that the physical or chemical information employed is that of the electronic circuit chip. However, the physical or chemical information of other sheet constituent elements which can discriminatively be identified and which are difficult to fabricate may be used. More specifically, in the case where the material of the sheet is paper, information of the paper fibers may be used as the information of concern or alternatively an discernible object which is difficult to manufacture may be embedded in the sheet so that information thereof can be used.

Second Embodiment

Next, description will be made of a second embodiment of the present invention.

According to the teachings of the invention incarnated in the instant embodiment, information of relative position of an externally discernible sheet constituent element relative to the electronic circuit chip is encrypted to be stored in the electronic circuit chip 13. By comparing this relative position information with the relative position information acquired by measuring or scanning the sheet 11 actually, check is performed as to whether or not the sheet is a forged one.

Figure 7:
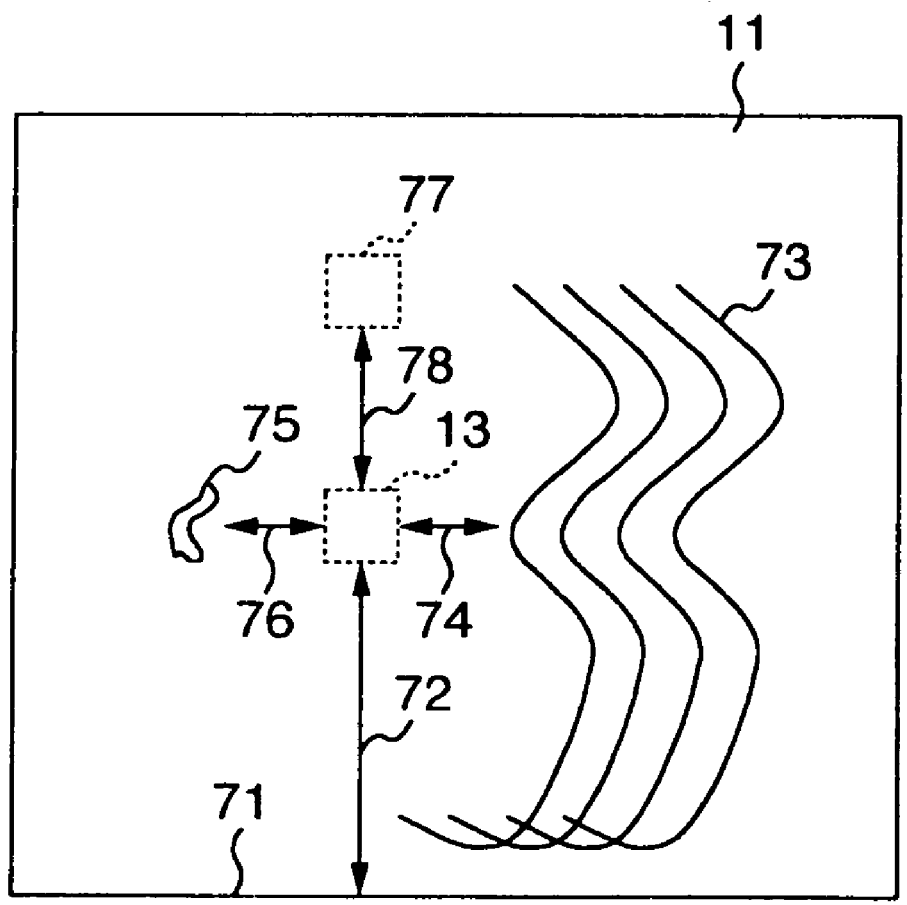
FIG. 7 is a view showing sheet constituent elements and relative position information of the sheet constituent elements relative to an electronic circuit chip according to a second embodiment of the present invention.

At first, reference is made to FIG. 7 which shows discernible sheet constituent elements and relative position information of the sheet constituent elements relative to the electronic circuit chip. In the figure, reference numeral 71 designates a side of the sheet 11 and numeral 72 designates a relative position of the side 71 relative to the electronic circuit chip 13. Further, relative position information of visible object 73 on the sheet surface such as patterns or the like is designated by numeral 74 while the relative position information of constituent elements 75 resident internally of the sheet such as paper fibers relative to the electronic circuit chip is designated by numeral 76 with relative position information of another electronic circuit 77 to the electronic circuit chip being designated by reference numeral 78. At least one of the relative position information 72, 74, 76 and 78 mentioned above is stored in the electronic circuit chip 13.

Figure 8:
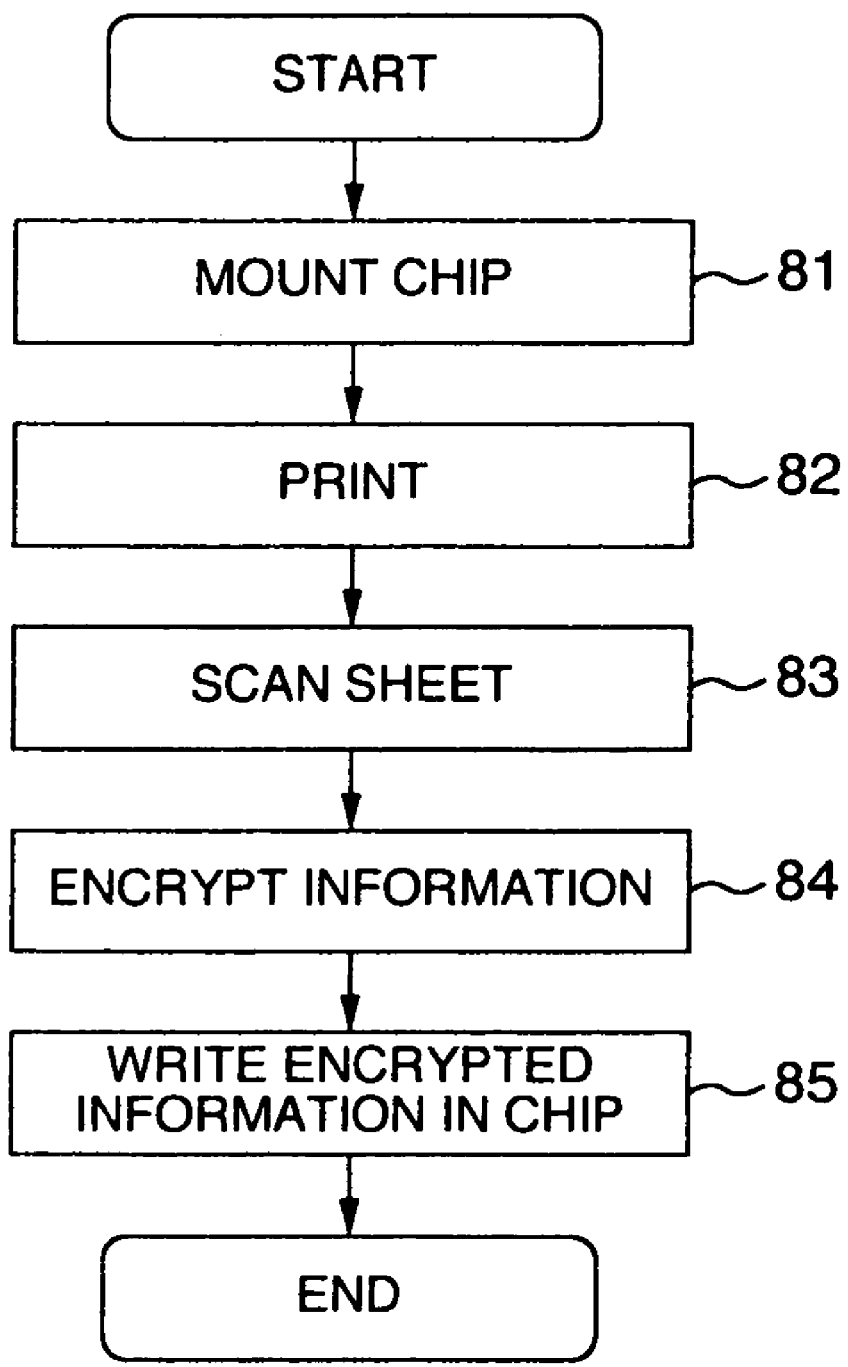
FIG. 8 is a flow chart for illustrating a procedure of manufacturing a forged sheet according to the second embodiment of the invention.

Now, reference is made to FIG. 8 which illustrates a procedure of manufacturing the sheet according to the instant embodiment of the invention.

After the electronic circuit chip 13 has been mounted on the sheet 11 at a random position (step 81), printing is performed on the sheet 11 (step 82). Then, by scanning the sheet 11, the relative position information described above is acquired (step 83), whereon the information as acquired is encrypted (step 84) to be subsequently written in the electronic circuit chip 13 mounted (step 85). Parenthetically, in the case of the instant embodiment of the invention, it is presumed that the sheet 11 made of paper is employed. However, material of the sheet 11 is not restricted to paper but other type of sheet can be employed so far as the material thereof is not homogeneous. In the procedure now under consideration, mounting of the electronic circuit chip 13, writing of the information in the electronic circuit chip 13, printing on the sheet 11 and scanning or measurement are carried out by using the devices or units employed in carrying out the first embodiment of the invention.

With the arrangement according to the instant embodiment described above, even if the electronic circuit chip 13 can be reproduced, it is difficult to embed the reproduced electronic circuit chip 13 in the sheet 11 made of nonhomogeneous material at the same position as the position where the genuine electronic circuit chip 13 is embedded in the authentic sheet 11, involving an error in respect to the mounting position. For this reason, the manufacturer of the electronic circuit chip 13 and the issuer of the sheet 11 can easily perform the check of the sheet without need for enhancing the accuracy for the mounting position of the electronic circuit chip 13, whereas for the forgers, high-precision techniques will be required for mounting the electronic circuit chip and for controlling the printing position. This feature is effective for preventing the forgery of the sheet.

Further, in the instant embodiment of the invention, the relative position information of constituent element located very closely to the electronic circuit chip may be included in the information to be stored upon storage of the relative position information 72, 74, 76 or 78 in the electronic circuit chip 13. In that case, it is expected that frequency at which contraction/expansion or breakage of the sheet occurs in a gap area intervening between the electronic circuit chip 13 and the sheet constituent element positioned closely thereto can be decreased, and at the same time the accuracy of the position information can be increased. For these reasons, in checking the sheets as to the authenticity thereof, the detection accuracy can be enhanced with the probability of erroneous detection or recognition being decreased.

Third Embodiment

Now, a third embodiment of the present invention will be described.

The instant embodiment differs from the first or second embodiment in that the information to be stored in the electronic circuit chip 13 is not encrypted but stored intactly as plaintext which is affixed with a digital signature. The digital signature gives the guarantee that the relevant text has not been falsified. Only the person who knows a private key is capable of creating the digital signature. A forger who does not know the private key may falsify or forge the plaintext but he or she can not newly create a digital signature that ensures the authenticity of the plaintext. Thus, falsification of the sheet can be detected by checking the authenticity of the digital signature.

Figure 9:
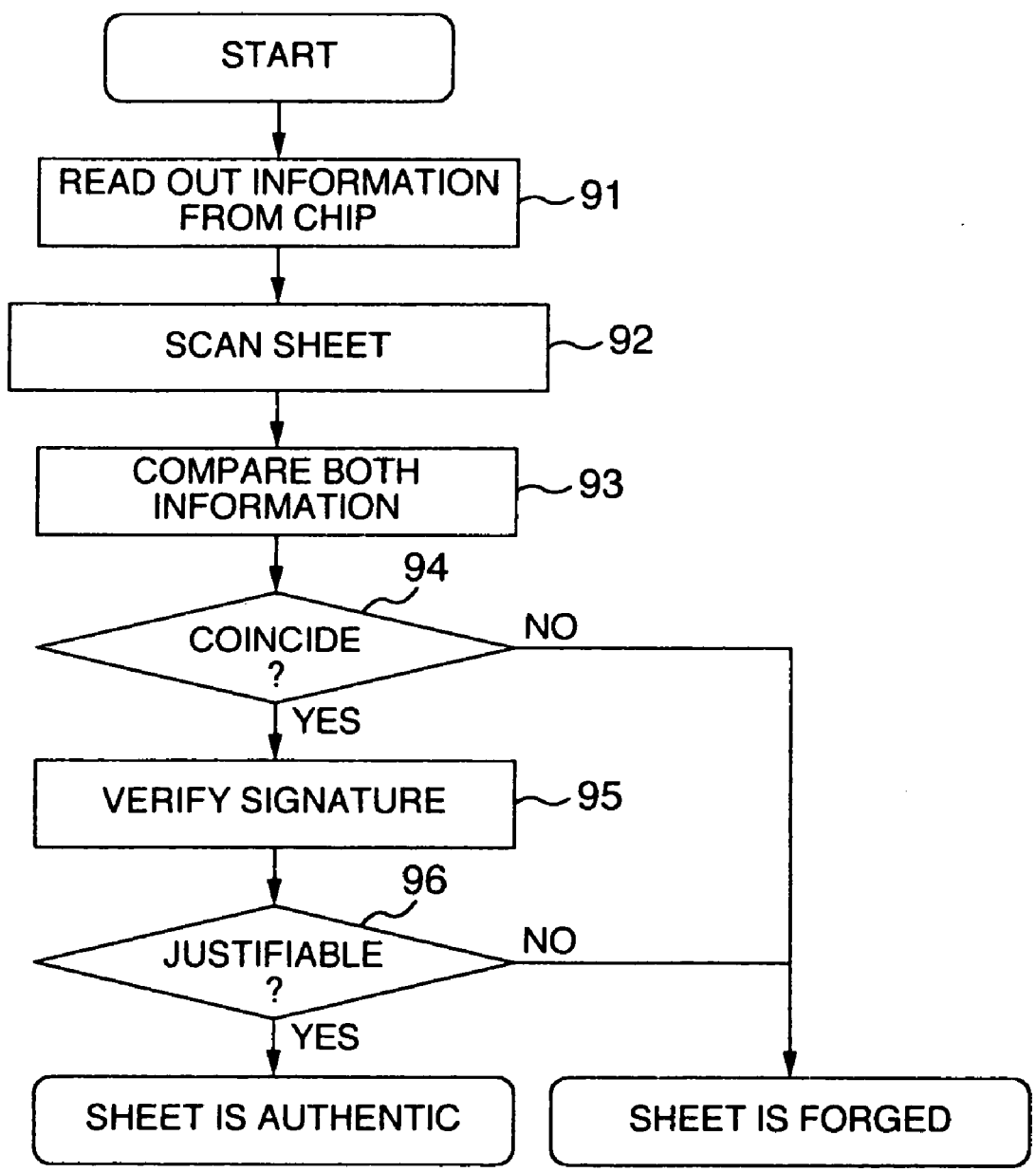
FIG. 9 is a flow chart for illustrating a forged sheet detecting procedure according to a third embodiment of the present invention.

FIG. 9 shows a flow chart for illustrating a forged sheet checking procedure according to the instant embodiment, which procedure is executed by the CPU 45 in the system configuration shown in FIG. 4. The processing illustrated in FIG. 9 can be realized by executing the program stored in the memory 46 by means of the CPU 45.

At first, the information stored in the electronic circuit chip 13 is read out by the relevant receiver unit 42 (step 91). For acquiring the information to be compared with the information as read out, the sheet 11 is scanned by the scanner unit 43 (step 92), and information processing such as an image processing or the like is carried out by the processing module 55.

The discriminating module 54 compares both the information acquired in the steps 91 and 92, respectively (step 93). When both the information differ from each other, the forgery checking system 47 decides that the sheet 11 is a forged one (step 94). On the other hand, when coincidence is found between both the information, the affixed digital signature information is transferred to the discriminating module 54 by the control module 52, whereon authenticity of the digital signature is verified (step 95). When the verification results in that the digital signature is justifiable, the forgery checking system 47 decides that the sheet is an authentic one. On the contrary, when the result of the verification is unjustifiable, the forgery checking system 47 decides that the sheet is a forged one (step 96).

In this way, according to the teaching of the invention incarnated in the instant embodiment, forgery of the sheet can be detected already at the stage of the step 94, which means that the steps 95 and 96 can be omitted. Thus, it is expected that the time taken for checking the counterfeitness of the sheet can be shortened when compared with the case where the encrypted information is used as described hereinbefore in conjunction with the first or second embodiment.

Further, in the system according to the instant embodiment, when transmission error takes place in the course of communication, verification of the digital signature will result in incorrectness. In that case, appropriate measurement such as rereading or the like can be taken. Thus, acquisition of erroneous information can be avoided.

As described previously, in the case of the instant embodiment, the plaintext information affixed with digital signature is stored in the electronic circuit chip 13 intactly without undergoing encryption, being affixed with the digital signature. It should however be mentioned that the information encrypted and affixed with the digital signature may equally be stored in the electronic circuit chip.

Furthermore, in the case of the instant embodiment, the digital signature is affixed for assuring that the information is not altered. However, instead of the digital signature, a falsification detecting code based on the common key cryptosystem may be affixed. Since the common key cryptosystem allows the verification processing to be executed at a higher speed when compared with the public key cryptosystem which is primarily adopted for the digital signature, the time required for detection of the forged sheet can further be shortened.

Fourth Embodiment

Next, referring to FIG. 4 and FIG. 10, a fourth embodiment of the present invention will be described.

In the case of the instant embodiment, genuineness of the sheet is decided synthetically by adopting a sheet 11 in which a plurality of electronic circuit chips 13 are incorporated.

Figure 10:
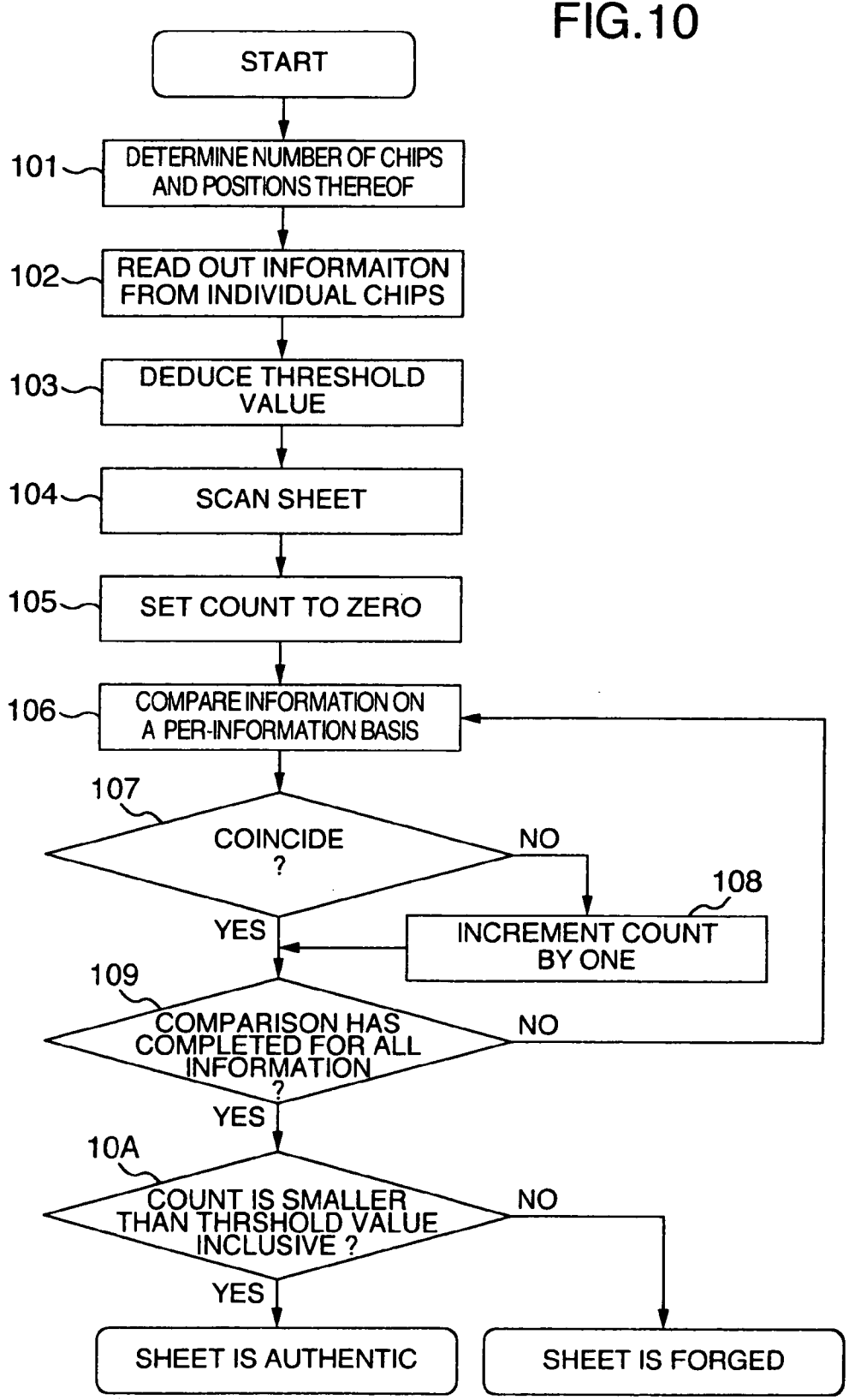
FIG. 10 is a flow chart for illustrating a forged sheet detecting procedure according to a fourth embodiment of the present invention.

FIG. 10 shows a flow chart illustrating a processing procedure according to the instant embodiment. The processing procedure illustrated in FIG. 10 can be realized by executing a program stored in the memory 46 by means of the CPU 45.

At first, the sheet 11 is scanned by the scanner unit 43 to thereby acquire the information about the number and the positions of the electronic circuit chips 13 incorporated in the sheet 11 (step 101). In succession, internal information stored in the individual electronic circuit chips 13 is acquired by means of the receiver unit 42 (step 102), whereon elementary information such as the number, accuracy, priorities and the like of the information are evaluated properly to thereby deduce a threshold value. The sheet 11 is scanned (step 104) and a counter value is set to "0" (zero) (step 105). The information acquired in the step 102 is compared with the information acquired in the steps 104 on a per-information basis (step 106). When difference is found between both the information (step 107), the counter value is incremented by "1" (one) (step 108). When comparison has completed for all the information (step 109), it is checked whether or not the counter value is smaller than the threshold value inclusive (step 10A). Unless the counter value exceeds the threshold value, it is decided that the sheet is genuine, whereas when the counter value exceeds the threshold value, decision is made that the sheet is a forged one (step 10A).

According to the invention incarnated in the instant embodiment, even when the sheet is wrinkled, bent or broken in the vicinity of the electronic circuit chips 13, bringing about deviation in the relative positions between the electronic circuit chips 13 and the peripheries, the frequency or possibility of the genuine sheet being mistaken for the forged sheet can be reduced.

Parenthetically, an appropriate evaluation method (evaluating expression) and a proper threshold value may previously be determined on the basis of the various internal information (e.g. the elementary information such as the number, accuracy, priority and the like of the information) stored in the electronic circuit chips 13 so that the detecting unit can make decision upon checking of the sheet as to the authenticity or genuineness in accordance with the predetermined evaluation method mentioned above.

Fifth Embodiment

Now, a fifth embodiment of the present invention will be described by reference to FIG. 14.

According to the teaching of the invention incarnated in the instant embodiment, the identification number inherent to the electronic circuit chip 13 is stored in the electronic circuit chip, and additionally information intrinsic to the sheet 11 or the electronic circuit chip 13 or the combination thereof is stored in a storing means other than the above-mentioned electronic circuit chip while establishing correspondency to the identification number of the electronic circuit chip mentioned above.

Now, description will turn to a method of detecting a forged sheet by reference to FIG. 4, FIG. 5 and FIG. 14. A hardware structure of a forgery checking system in carrying out the method according to the instant embodiment is shown in FIG. 4, while a software structure of the forgery checking system is shown in FIG. 5. FIG. 14 shows a flow chart for illustrating a forged sheet checking procedure according to the instant embodiment of the invention.

At first, the control module 52 issues a command to the transmitter unit 41 for sending a radio wave in the direction toward the sheet 11 for thereby feeding an electric power to the sheet 11 (step 61). The electronic circuit chip 13 supplied with the electric power through the medium of the radio wave sends out the inherent information stored therein by way of the antenna 15, the signal as sent out being received by the receiver unit 42 (step 62). The control module 52 issues a command to the transmitter unit 41 to send the inherent information to the computer 49 connected via the network 48 (step 141). Upon reception of the inherent information (step 142), the computer 49 extracts the information corresponding to the received inherent information from among the information inherent to the sheet 11 or the electronic circuit chip 13 or the combination thereof held in correspondence to the inherent information, to thereby send the extracted information to the forgery checking system 47 after encryption (step 143). The receiver unit 42 receives the information from the computer 49 (step 144) to transfer it to the control module 52. The control module 52 in turn transfers the information to the decrypting module 53 which responds thereto by decrypting the information (step 63).

The scanner unit 43 scans the surface of the sheet 11 and the internal structure thereof (step 64). The control module 52 transfers the image information and others as acquired to the processing module 55 which responds thereto by executing the information processing such as image processing or the like (step 65).

The discriminating module 54 compares the decrypted information transferred from the computer 49 by way of the decrypting module 53 with the information acquired by scanning the sheet 11 as transferred from the processing module 55 (step 66). When both the data coincide with each other, it is then decided that the information 12 on the sheet surface is authentic, whereas in case both the data differ from each other, decision is then made that the information 12 on the sheet is counterfeit (step 67).

The control module 52 commands the output unit 44 to output the information which conforms with the result of the decision made by the discriminating module 54 through a display or the like means.

The operations and the processings described above by reference to FIGS. 5 and 14 can be realized by executing a program stored in the memory 46 by means of the CPU 45.

In the case of the instant embodiment, the information inherent to the sheet 11 or the electronic circuit chip 13 or the combination thereof is stored in the computer 49. Consequently, even when an unwritable electronic circuit chip is employed, forgery can equally be prevented similarly to the case of the first, second, third or fourth embodiment of the present invention. As a result of this, the circuit scale of the electronic circuit chip can be made smaller and thus the chip can be manufactured inexpensively in a reduced size. Thus, the invention incarnated in the instant embodiment is effective for realizing the prevention against forgery of the sheet at a low cost.

Parenthetically, it should be added that although the computer 49 is employed as the destination for storing the information inherent to the sheet 11 or the electronic circuit chip 13 or the combination thereof in the case of the instant embodiment of the present invention, it goes without saying that a storing means other than the computer such as a flash memory card, an electronic circuit chip, etc. may be used.

By way of example, a plurality of inexpensive unwritable electronic circuit chips 13 storing the number inherent to the sheet 11 may be incorporated in the sheet 11 while the information inherent to the sheet 11 or the electronic circuit chip 13 or the combination thereof may be stored in one writable electronic circuit chip. In that case, substantially same degree of readability as in the case where a plurality of expensive writable electronic circuit chips are mounted can be realized without using a plurality of expensive writable electronic circuit chips.

Further, it is also possible to combine the first to fifth embodiments described heretofore.

Sixth Embodiment

Next, description will be directed to a sixth embodiment of the present invention.

Figure 11:
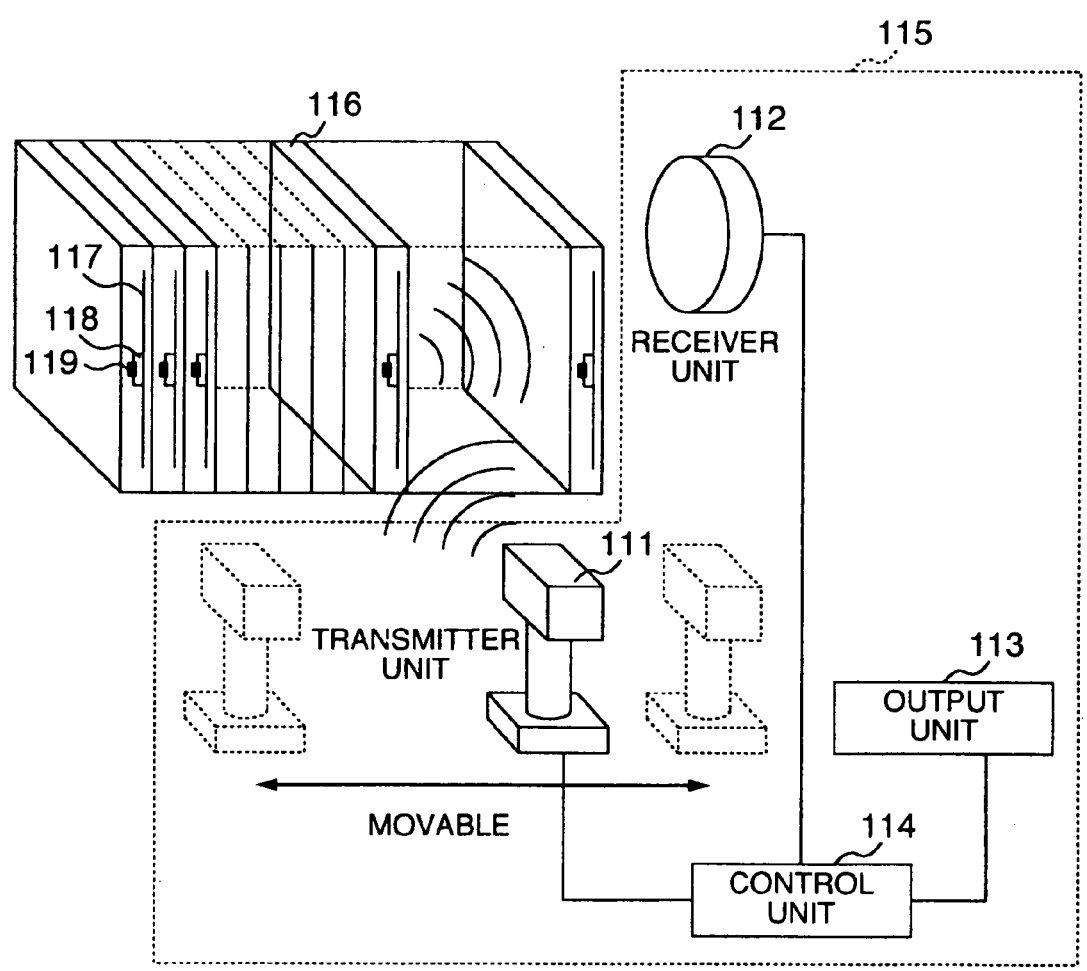
FIG. 11 is a view showing sheets and a configuration of a sheet management system according to a sixth embodiment of the present invention.

FIG. 11 is a view showing sheets and a configuration of a sheet management system, and FIG. 13 is a flow chart for illustrating a sheet management procedure. By referring to FIGS. 11 and 13, description will be made of a sheet managing method according to the instant embodiment.

Referring to FIG. 11, the sheet managing method according to the instant embodiment will be described. Reference numeral 111 denotes a transmitter unit which is designed for feeding an electric power to the sheet through the medium of a radio wave and sending a command to the sheet. The transmitter unit is disposed movably along the direction in which the sheets are stacked. Numeral 112 denotes a receiver unit designed for receiving signals emitted from the sheets. Numeral 113 denotes an output unit designed for outputting management statuses of the sheets. Numeral 114 denotes a control unit designed for controlling the transmitter unit 111, the receiver unit 112 and the output unit 113. Numeral 115 generally denotes a system designed for management of the sheets. Mounted on each sheet 116 at a peripheral portion thereof are an antenna 117, a capacitor 118 and an electronic circuit chip 119, respectively, for the purpose of enabling contactless communication with the management system 115.

The electronic circuit chip 119 mounted on the sheet 116 incorporates therein a random number generating means (random number generating program executed by the CPU or a dedicated circuit), a storing means (a register, a memory or the like) for storing the inherent information (e.g. visible information such as an identification number, species, face amount, etc.), a signal transmitting means and a signal receiving means.

When the radio wave is applied to the antenna 117 from the transmitter unit 111, a potential difference is induced in the antenna 117, as a result of which electric charges are stored in the capacitor 118. Thus, electric power is supplied to the electronic circuit chip 119 (step 135). The electronic circuit chip 119 then generates a random number (step 131). On the basis of the random number as generated, a signal indicative of the above-mentioned information inherent to the sheet 116 is intermittently sent out with every transmission interruption period changing at random (step 132). Upon reception of this signal by the receiver unit 112 (step 136), the control unit 114 performs recognition and registration of the relevant sheet 116 (step 137), whereon a stop command valid to only that sheet 116 is issued from the transmitter unit 111 (step 138). Upon reception of the stop command (step 133), the sheet 116 stops the transmission from that time on (step 134).

In case the system can not correctly receive the signals sent from the plural sheets due to superposition of the signals (step 136), the management system 115 does not issue the stop command but waits for till the signal inherent to the sheet is sent again. Since the inherent signal as sent intermittently at random interval, the signals sent from all the sheets can be received after lapse of a predetermined time period (step 139). The control unit 114 manages the sheets with the information inherent to the individual sheets.

The management statuses of the sheets are outputted through the output unit 113.

By using the transmitter unit 111 having the radio wave coverage limited and recognizing the sheets while moving the transmitter unit along the direction in which the sheets are stacked, the ratio at which the signals emitted from the plural sheets are received concurrently can be reduced. Thus, management of the plural sheets can be carried out at a high speed with enhanced reliability.

As can now be appreciated, by virtue of the arrangement according to the instant embodiment of the invention, a large number of sheets of different species and/or sizes can be managed in the stacked state at a stretch with high reliability with the apparatus of a small size.

By way of example, those sheets which are required to be managed with high reliability such as registered mail, paper currency, certificate of share/stock, gift certificate, etc. can individually be managed in the state stacked or put together, being bundled by a belt or a cord, packaged or contained in a bag, which contributes to reduction of the time taken for the management of the sheets as well as prevention of missing and stealage.

Figure 12:
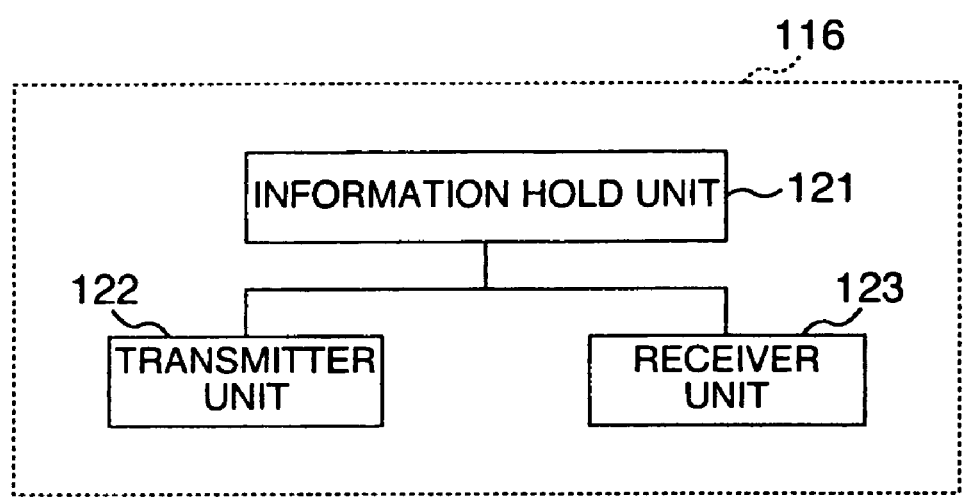
FIG. 12 is a view showing a structure of the sheet according to the sixth embodiment of the present invention.

Parenthetically, the sheet according to the instant embodiment of the invention is not restricted to the structure described above. Namely, the sheet is required to be equipped with an information hold unit 121, a transmitter unit 122 and a receiver unit 123, as is shown in FIG. 12, but need not necessarily include the antenna 117, the capacitor 118 and the electronic circuit chip 119.

Although the embodiments of the invention have been described on the presumption that they are applied to managements of sheets and cards, the present invention is never restricted thereto. Other objects having visible information may be handled without departing from the spirit and scope of the present invention.

INDUSTRIAL APPLICABILITY

As is apparent from the foregoing description, according to the teachings of the present invention, it is possible to make it difficult to forge or counterfeit the sheet carrying the visible information such as bond, gift certificate, paper currency, document and the like. Besides, even if the sheet should be forged, detection thereof can be facilitated.

Furthermore, a large number of sheets differing one another in respect to the species and the size can speedily be managed at a stretch with high reliability by the apparatus of a small scale.

The invention claimed is:

1. A system for determining authenticity of an object carrying visible information therein, said system including an authenticity determining unit and a memory unit,
   said object including an electronic circuit chip having no rewritable function and which stores a unique number, and
   said memory unit storing said unique number and information carried in common by said object and a plurality of objects of a same species as said object, and also storing a correlation between the common information of said same species and the unique number stored by said object, wherein said object and each of the plurality of objects carries the same said common information, said common information identifies said objects carrying said common information as being of said same species, and said common information is visible information as carried by said object and the plurality of objects,
   wherein said authenticity determining unit
   reads out said stored unique number from said electronic circuit chip;
   obtains from said memory unit the stored common information correlated with said unique number which is stored in said memory unit;
   acquires the visible information from said object by measuring or scanning; and
   compares said obtained stored common information with the visible information acquired by measuring or scanning said object to determine whether said object is authentic or not.

2. An authenticity determining system according to claim 1, wherein said authenticity determining unit includes a transmitter and a receiver,
   said transmitter is responsive to an instruction from said authenticity determining unit to supply electric power to said object by transmission of an electric wave,
   said electronic circuit chip provided in said object is responsive to supply of electric power by said electric wave to transmit said unique number stored therein, and
   said authenticity determining unit is responsive to reception by said receiver of said transmitted unique number to cause said transmitter to output the unique number to said memory unit.

3. An authenticity determining system according to claim 1, wherein said memory unit encrypts the common information when taken out by said authenticity determining unit,
   said authenticity determining unit includes a decrypting unit, and
   said decrypting unit decrypts the common information when taken out by said authenticity determining unit and outputs the decrypted information to said authenticity determining unit.

4. An authenticity determining system according to claim 1, wherein said memory unit is formed of another electronic circuit chip provided in said object.

5. An authenticity determining system according to claim 1, wherein said authenticity determining unit comprises an output unit and a control unit, and said control unit outputs a result of said determination by said authenticity determining unit to said output unit.

6. An authenticity determining system according to claim 1, wherein said authenticity determining unit comprises an image processing unit, and
   said image processing unit image-processes said visible information acquired from said object by measuring on the object, and outputs a result of the image processing thereof to said authenticity determining unit.

* * * * *